March 10, 1942.
J. E. BEVINS
2,275,719
RATE OF CLIMB INDICATOR
Filed Sept. 17, 1936
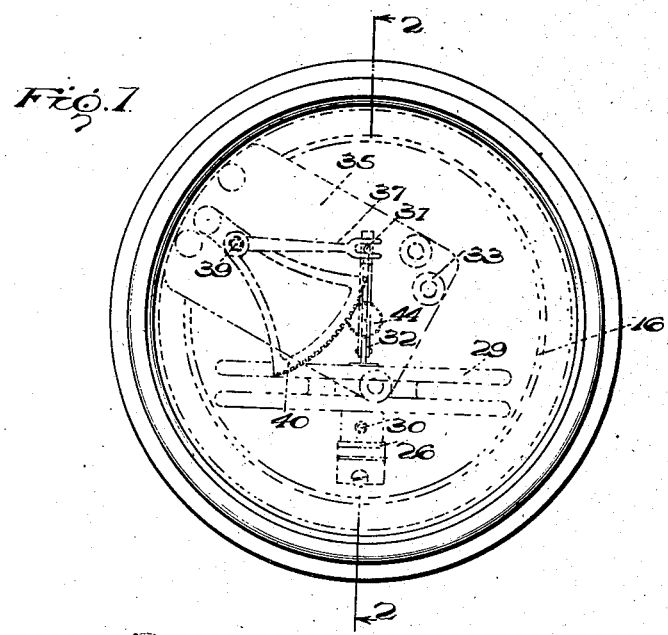
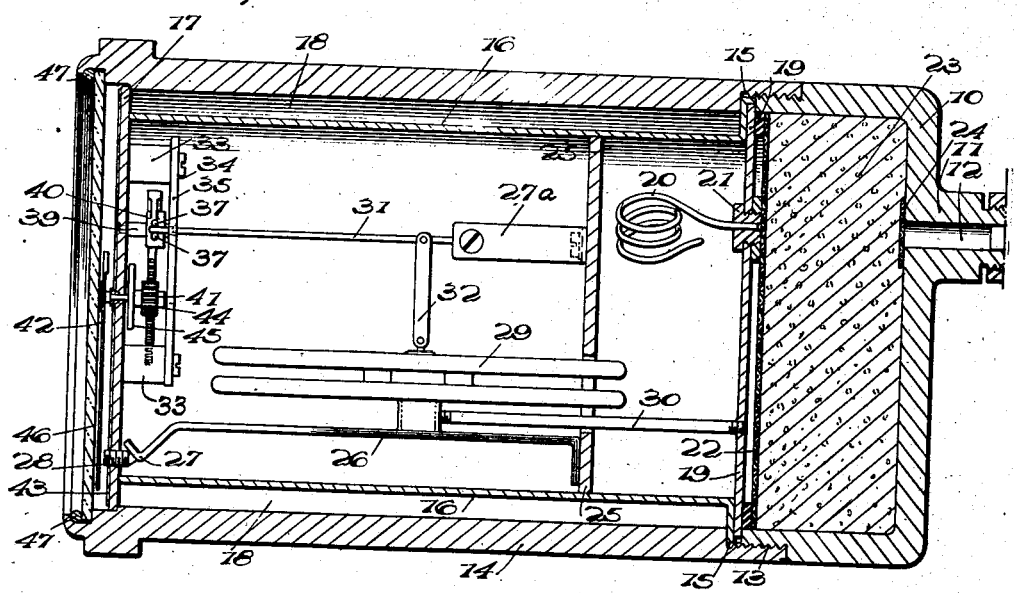
Inventor
James E. Bevins.
By Stephen Cerstvik
Attorney Patented Mar. 10, 1942

2,275,719

UNITED STATES PATENT OFFICE 2,275,719

RATE OF CLIMB INDICATOR

James E. Bevins, Bronx, N. Y., assignor to Bendix Aviation Corporation, South Bend, Ind., a corporation of Delaware Application September 17, 1936, Serial No. 101,349

21 Claims. (Cl. 73—179)

This invention relates to pressure responsive indicating instruments of the type in which a differential between the pressures inside and outside a pressure responsive device, established by a change in one of said pressures, is utilized to operate an indicator, and wherein means are provided for the equalization of said pressures when said change no longer takes place. An example of such an instrument is a rate of climb indicator for aircraft, and the invention is illustrated and described hereinafter in connection with such an instrument, but it will be understood that it is not restricted to this particular use.

Instruments such as rate of climb indicators have heretofore provided for equalization of pressures, as aforesaid, by means of a capillary tube, but in the copending application of Gregory V. Rylsky, Serial No. 101,346, filed September 17, 1936, there is disclosed the use of diffusing means whereby equilibrium of pressure is restored due to molecular diffusion, without the usual capillary tube. The present invention utilizes in part the invention of the aforesaid application, now U. S. Patent No. 2,147,108, February 14, 1939, and it is an object of the invention to provide an instrument embodying diffusing means which is of novel and simple construction.

Another object of this invention is to provide a novel instrument of the type characterized above in which the pressure differential is established both by the use of a diffusing element and by the use of a capillary element.

A further object of this invention is to provide a novel instrument of the class described that requires no compensator for altitude changes.

A still further object of this invention is to provide a novel rate of climb indicator in which the active volume of the instrument is the volume of the case.

A still further object of this invention is to provide a novel rate of climb indicator of simple construction, few parts, positive action, and accurate under all conditions of operation.

Other and further objects of this invention will appear hereinafter.

One embodiment of the invention is illustrated in the accompanying drawing, but it is to be expressly understood that said drawing is for purposes of illustration only and is not to be taken as a definition of the limits of the invention, reference being had to the appended claims for this purpose.

In the accompanying drawing:

Fig. 1 is a plan view of one instrument embodying the present invention showing the relative positions of the operating mechanism; and Fig. 2 is a section taken on the line 2—2 of Fig. 1.

The invention may be embodied in instruments of any suitable type, size and construction.

Referring now to the drawing, in which like reference numerals indicate like parts, the base 10 of the casing is made of Bakelite or other suitable material and is provided with a projection 11 traversed by a passage 12 which joins the interior of base 10 with the outside atmosphere. Said base 10 serves to support the operating mechanism, and the casing is completed by any suitable means which may include heat insulation. As here shown, base 10 has screw threads 13 which engage a casing portion 14 also made of Bakelite or other suitable material, and clamped between base 10 and portion 14 is the circumferential flange 15 of a metallic case 16 made of aluminum, brass or other suitable material. A face plate 17 is seated on a flange in the portion 14 and also against the end of the case 16, enclosing between said case 16 and portion 14 an insulating and dead air space 18 and also forming a closure for one end of said case 16. The opposite end of the case 16 is closed by a diffusor element 19, clamped between flange 15 and base 10, said diffusor element being made of porcelain, carbon, paper, thin films of gold or other metals, or any other suitable porous material. Passing through the diffusor element 19 is a capillary element 20 made of nickel or other suitable material, said element being mounted in a suitable fitting 21. Hence, the case 16, plate 17 and element 19 form a chamber that is closed except for the escape of air through the capillary element 20 and diffusor 19. In the present embodiment, air leaving or entering said chamber in this manner passes through suitable dehumidifying means and to this end the base 10 may be provided with a screen 22 and a dehydrating substance 23 which may be a silica-jel, calcium oxide, or other suitable dehydrating element. Passage 12 may likewise be protected by a screen 24.

Pressure responsive means of any suitable type is enclosed in said chamber and adapted through suitable connections to actuate the pointer of the instrument, the interior of said means communicating with the atmosphere outside the instrument preferably through the dehumidifying substance 23. In the form shown, a frame 25 extends across the case 16 and carries a resilient arm such as a leaf spring 26 terminating in a shoe 27, and a bracket 27a. Carried by face plate 17 is a screw 28 engaging shoe 27 and designed to regulate the position of resilient arm 26 which carries the pressure responsive diaphragm device 29, thereby providing for zero adjustment of the instrument by bodily movement of said device along its operating axis. Said pressure responsive element is in open communication with the atmosphere outside of the instrument through the conduit 30 which passes through the diffusor element 19 and opens into the dehydrating medium 23 behind the screen 22.

Pivotally mounted on bracket 27a is an arm 31 that is connected to the diaphragm device 29 by link 32 so as to be moved in response to expansion and contraction of said diaphragm device. Carried by face plate 17 and spaced apart therefrom as by spacers 33 and bolts 34 is frame 35, and journaled in said frame 35 and face plate 17 is a spindle 39 carrying a counterweighted gear sector 40 which is rotated, upon expansion of device 29, by engagement of arm 31 with a fork 37 secured to said sector. A second spindle 41, parallel to and spaced apart from spindle 39, is also journaled in frame 35 and face plate 17 and passes through the latter. There is provided on the outer end of spindle 41 a pointer 42 that travels over a scale 43 fixed to face plate 17. The spindle 41 is rotated by a pinion 44 thereon which engages gear sector 40, and is provided with a tensioned hair spring 45. Pointer 42 and scale 43 are protected by and visible through a glass 46 held in position by the usual split ring 47.

On an increase in altitude, the pressure surrounding the instrument and, accordingly, that in the dehydrator 23 and in the diaphragm device 29 will be reduced in magnitude. However, the pressure inside the case 16 cannot instantaneously equalize with the atmospheric pressure outside as the gases within the case must diffuse out through diffusor 19 or escape through capillary element 20. Hence, as long as altitude is increasing, the pressure in case 16 is greater than that within the diaphragm device 29 and the magnitude of this pressure differential will depend upon the rate of change of altitude or the rate of climb. This pressure differential will cause diaphragm device 29 to contract, drawing link 32 downward and rotating arm 31 in a downward direction so that fork 37 and sector 40 will rotate in a clockwise direction (Fig. 1) and pinion 44 and pointer 42 in a counterclockwise direction so as to indicate the rate of climb on scale 43. If the increase in altitude is stopped and the instrument kept at a constant altitude, then the pressure within case 16 will equalize with that of the atmosphere and the pressure differential will reduce to zero. Diaphragm device 29 then expands to its normal position, link 32 and arm 31 move upwards, fork 37 and gear sector 40 are rotated in a counterclockwise direction, pinion 44 and pointer 42 are rotated in clockwise direction and return to the zero position.

On a decrease in altitude the pressure within the dehydrator 23 and the diaphragm device 29 will be increased but the pressure within case 16 cannot instantaneously equalize with the outside pressure as the gases must diffuse through the diffuser 19 and capillary element 20. As long as altitude is decreasing, the pressure within the diaphragm device 29 will be greater than that within the case 16, the pressure differential being proportional to the rate of decrease in altitude. Under the action of this pressure differential, diaphragm device 29 will expand, moving link 32 and arm 31 upward and rotating fork 37 and gear sector 40 in a counterclockwise direction which rotates pinion 44 and pointer 42 in a clockwise direction, showing the rate of decrease in altitude on scale 43. If the decrease in altitude be stopped and the instrument held at a constant altitude, the pressure within the case 16 will equalize with that in the diaphragm device and the pressure differential will be reduced to zero. The diaphragm device will then contract to its normal position drawing link 32 and arm 31 downward and rotating fork 37 and gear sector 40 in a clockwise direction, which in turn will rotate pinion 44 and pointer 42 in a counterclockwise direction back to their normal or zero position.

The use of both a diffusor element and a capillary element is particularly advantageous from the standpoint of compensation for altitude changes. When the capillary element alone is tested in the instrument it gives a rising characteristic for a constant rate of climb as the altitude increases; that is, as the altitude is increased, the differential pressure for the same rate of change of altitude is increased. On the other hand, the diffusor element, if tested alone in the instrument, gives a falling characteristic for increases in altitude for a constant rate of climb. It is to be noted that the characteristic can be varied by choosing the particular type of element, namely, a capillary or diffuser, but as described in detail in co-pending application, Serial No. 101,346 the amount of fall of the characteristic of the diffuser can be reduced to zero or even changed to a rise. Therefore, by using both a diffusor element and a capillary element the rising characteristic of the one is balanced by the falling characteristic of the other and a uniform indication will be had for the same rate of change of altitude, no matter at what altitude the change takes places, and no compensating means is required.

While only one embodiment of the invention has been described and illustrated in the drawing, it will be understood that the invention is not limited thereto but is capable of a variety of mechanical forms and that changes may be made in the form, details of construction and arrangement of the parts without departing from the spirit of the invention. Reference should therefore be had to the appended claims for a definition of the limits of the present invention.

What is claimed is:

1. In a pressure responsive instrument having a case and a pressure responsive device in said case, means for establishing a pressure differential between the atmosphere in said pressure responsive device and the atmosphere in said case, said means including a diffusor and a capillary so regulating the flow through said means that altitude compensation ensues.

2. In a rate of climb indicator having a case and a pressure responsive device in said case, means for establishing a pressure differential between the atmosphere in said pressure responsive device and the atmosphere in said case upon a change in altitude, said means including a porous diffusor and a capillary so regulating the flow through said means that altitude compensation ensues.

3. In an instrument of the class described having a case and a pressure responsive device in said case, means for establishing a pressure differential between the atmosphere in said pressure responsive device and the atmosphere in said case upon a change in altitude, said means including a porcelain diffusor and a capillary so regulating the flow through said means that altitude compensation ensues.

4. In a pressure responsive instrument having a case and a pressure responsive device in said case, and means for creating a pressure differential between the atmosphere in said pressure responsive device and the atmosphere in said case, said means including a diffusor and a capillary, said diffusor closing the end of said case and said capillary passing through said diffusor.

5. In a pressure responsive instrument having a case and a pressure responsive device in said case, means for creating a pressure differential between the atmosphere in said pressure responsive device and the atmosphere in said case, said means including a diffusor and a capillary, so regulating the flow through said means that altitude compensation ensues, said diffusor closing the end of said case, and said capillary joining said case and the atmosphere.

6. In a rate of climb indicator, a casing element and a pressure responsive element therein, means joining one of said elements with the atmosphere, and means for creating a pressure differential between the atmosphere in said one element and the atmosphere in the other element, said means comprising a diffusor and a capillary joining said other element with the atmosphere and so regulating the flow through said means that altitude compensation ensues.

7. In a rate of climb indicator, a case, a pressure responsive device in said case, a plate closing said case at one end, a diffusor closing said case at the opposite end, a capillary passing from said case through said diffusor, and means providing an unrestricted passage passing through said diffusor into said pressure responsive device whereby, upon a change in altitude, a pressure differential is established by said diffusor and said capillary between the atmosphere in said case and the atmosphere in said pressure responsive device to actuate said pressure responsive element.

8. In an instrument of the class described, a case, a pressure responsive device in said case, and means for establishing a pressure differential between the atmosphere in said case and the atmosphere in said pressure responsive device, said means including means producing a rising characteristic for increased altitude and means producing a falling characteristic for increased altitudes.

9. In a rate of climb indicator, a case, a pressure responsive device in said case, a plate closing one end of said case, a diffusor closing the opposite end of said case, a capillary passing through said diffusor from said case, a conduit passing through said diffusor from said pressure responsive device, dehydrating means between said diffusor and the outside atmosphere, a pointer, a scale for said pointer, and means operatively connecting said pointer and said pressure responsive device whereby, upon a change of altitude, a pressure differential is established by said diffusor and said capillary between the atmosphere in said case and the atmosphere in said pressure responsive device to actuate said pressure responsive device and move said pointer over said scale.

10. In a rate of climb indicator, a case, heat insulating means for said case, a pressure responsive device in said case, a plate closing one end of said case, a diffuser closing the opposite end of said case, a capillary passing through said diffuser from said case, a conduit passing through said diffuser from said pressure responsive device, dehydrating means for all gases drawn into said case and said pressure responsive device, a pointer, a scale for said pointer fixed to said plate, and means for operatively connecting said pointer and said pressure responsive device whereby, upon a change in altitude, a pressure differential is established by said diffuser and said capillary between the atmosphere in said case and the atmosphere in said pressure responsive device to actuate said pressure responsive device and move said pointer over said scale.

11. In combination, a pressure responsive device having a movable element subject to a changing atmospheric pressure on one side thereof, means for controlling the rate at which pressure on the other side of said element tends to become equal to said changing atmospheric pressure, and indicating means actuated by said movable element in accordance with the rate of change of altitude, said controlling means including a diffuser and capillary so regulating the flow through said means that altitude compensation ensues.

12. In combination, a pressure responsive device having a movable element subject to a changing atmospheric pressure on one side thereof, means for controlling the rate at which pressure on the other side of said element tends to become equal to said changing atmospheric pressure, and indicating means actuated by said movable element in accordance with the rate of change of altitude, said controlling means including means producing a rising characteristic for increased altitude and means producing a falling characteristic for increased altitude.

13. In an instrument of the class described, means responsive to a pressure differential, means for equalizing said pressure differential comprising means regulating said equalization whereby it occurs at a rate rising with changes in atmospheric pressure, and means regulating said equalization at a rate falling with the same changes in conditions of the atmosphere whereby errors due to said changes are compensated.

14. In a device of the class described, means responsive to a change in pressure, indicating means actuated by said responsive means, means supplying a reservoir of a pressure producing medium connected to said responsive means, means regulating the equalization of pressure between said reservoir and said responsive means comprising means impeding said equalization with a change in atmospheric pressure, and means accelerating said equalization with the same change, whereby errors in said device due to said change are compensated.

15. In a device of the character described, means operative in response to a pressure differential, and means for equalizing said pressure differential, said equalizing means comprising means regulating said equalization whereby the rate thereof is increased with a change in atmospheric pressure, and means whereby said equalization rate is decreased with the same change in atmospheric pressure.

16. In a device of the character described, means for establishing a pressure differential to cause flow in response to changes in atmospheric pressure, means controlling the flow of said first means to modify said flow in one direction in response to changes in pressure, and means controlling the flow of said first means in an opposite direction in response to said changes of pressure whereby errors in said device due to changes in pressure are compensated.

17. In a vertical speed responsive instrument the combination with a chamber enclosing a volume of air; and a differential pressure responsive member connected to respond to a difference in pressure between said chamber and the atmospheric air; of a constricted passage of both capillary and pin hole properties connecting said chamber and the atmosphere.

18. In a device of the character described, the combination with a chamber enclosing a volume of air, and a differential pressure responsive member connected to respond to a difference in pressure between said chamber and the atmospheric air, of means providing a constricted passage between said chamber and the atmosphere, said means including means automatically responsive to a change in density of the air for producing an increase in resistance to flow through said passage in response to such change in density, and means automatically responsive to a change in density of the air for producing a decrease of resistance in response to the same change in density, whereby said device will remain unaffected by changes in density of the air, density being a function of temperature as well as absolute pressure.

19. In a device of the character described, the combination with a chamber enclosing a volume of air, and a differential pressure responsive member connected to respond to a difference in pressure between said chamber and the atmospheric air, of means providing a constricted passage between said chamber and the atmosphere, said means including an element having the inherent property of increasing its resistance to flow therethrough in response to a change in density of the air, and means automatically responsive to a change in density of the air for producing a decrease of resistance in response to the same change in density, whereby said device will remain unaffected by changes in density of the air, density being a function of temperature as well as absolute pressure.

20. In a device of the character described, the combination with a chamber enclosing a volume of air, and a differential pressure responsive member connected to respond to a difference in pressure between said chamber and the atmospheric air; of means providing a constricted passage between said chamber and the atmosphere, said means including a capillary constriction inherently producing an increase in resistance to flow therethrough in response to a change in density of the air, and means automatically responsive to a change in density of the air for producing a decrease in resistance of said passage in response to the same change in density, density being a function of temperature as well as absolute pressure.

21. In a device of the character described, the combination with a chamber enclosing a volume of air, and a differential pressure responsive member connected to respond to a difference in pressure between said chamber and the atmospheric air, of means providing a constricted passage between said chamber and the atmosphere, said means including a capillary constriction inherently producing an increase in resistance to flow therethrough in response to a change in absolute pressure of the air, and means automatically responsive to a change in pressure of the air for producing a decrease in resistance of said passage in response to the same change in absolute pressure.

JAMES E. BEVINS.